United States Patent
Zhao et al.

(10) Patent No.: US 10,810,236 B1
(45) Date of Patent: Oct. 20, 2020

(54) INDEXING DATA IN INFORMATION RETRIEVAL SYSTEMS

(71) Applicant: Twitter, Inc., San Francisco, CA (US)

(72) Inventors: Yan Zhao, San Francisco, CA (US); Paul Burstein, San Francisco, CA (US); Yi Zhuang, San Francisco, CA (US); Michael Busch, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 383 days.

(21) Appl. No.: 15/790,436

(22) Filed: Oct. 23, 2017

Related U.S. Application Data

(60) Provisional application No. 62/411,514, filed on Oct. 21, 2016.

(51) Int. Cl.
  *G06F 16/20* (2019.01)
  *G06F 16/31* (2019.01)
  *G06F 16/93* (2019.01)
  *G06F 16/33* (2019.01)

(52) U.S. Cl.
  CPC .......... *G06F 16/313* (2019.01); *G06F 16/334* (2019.01); *G06F 16/93* (2019.01)

(58) Field of Classification Search
  None
  See application file for complete search history.

(56) References Cited

U.S. PATENT DOCUMENTS 6,496,820 B1 * 12/2002 Tada ..................... G06F 16/30
2013/0024459 A1 * 1/2013 Bodd ..................... G06F 16/319
  707/741
2016/0283474 A1 * 9/2016 Patterson ................ G06F 16/93

OTHER PUBLICATIONS

Beigbeder et al., "Open Source Information Retrieval," Second Workshop in Conjunction with the 2006 ACM Special Interest Group on Information Retrieval (SIGIR) Conference, Aug. 10, 2006, 73 pages.
Blog.Twitter.com [online], "Introducing Omnisearch," May 5, 2016, [retrieved on Jan. 11, 2019], retrieved from: URL <https://blog.twitter.com/engineering/en_us/a/2016/introducing-omnisearch.html>, 4 pages.

(Continued)

*Primary Examiner* — Belix M Ortiz Ditren
(74) *Attorney, Agent, or Firm* — Fish & Richardson P.C.

(57) ABSTRACT

Methods, systems, and apparatus, including computer programs encoded on computer storage medium, for indexing data in information retrieval systems. In one aspect, a system includes computer readable storage media, where the non-transitory computer readable storage media include postings lists for a term, where each posting list includes postings blocks, position blocks, and metadata blocks. Each postings block includes document identifiers and respective indications of frequency of the term in each document. Each position block includes position indications for the term in the documents of a corresponding postings block. Each metadata block includes an indication of the size of the document identifiers in the associated postings block, an indication of the size of the indications of frequency of terms in the associated postings block, an indication of a number of postings in the associated postings block, and an indication of position information for postings in the associated postings block.

25 Claims, 4 Drawing Sheets

(56) References Cited

OTHER PUBLICATIONS

Blog.Twitter.com [online], "Omnisearch Index Formats," Nov. 4, 2016, [retrieved on Jan. 11, 2019], retrieved from: URL <https://blog.twitter.com/engineering/en_us/topics/infrastructure/2016/omnisearch-index-formats.html>, 13 pages.

Lucene.Apache.org [online], "Apache Lucene—Index File Formats," Jun. 21, 2013, [retrieved on Jan. 11, 2019], retrieved from: URL <https://lucene.apache.org/core/3_5_0/fileformats.html>, 19 pages.

Yitzhak et al., "Beyond Basic Faceted Search," Proceedings of the 2008 International Conference on Web Search and Data Mining, Feb. 11-12, 2008, pp. 33-43.

\* cited by examiner

INDEXING DATA IN INFORMATION RETRIEVAL SYSTEMS

CROSS-REFERENCE TO RELATED APPLICATIONS

This application claims the benefit under 35 U.S.C. § 119(e) of the filing date of U.S. Patent Application No. 62/411,514, which was filed on Oct. 21, 2016, and which is incorporated here by reference.

BACKGROUND

This specification relates to information retrieval.

Information retrieval systems typically avoid the problem of having to scan each document in response a search request by precomputing the occurrence of terms in a set of documents and storing the results of the pre-computation in one or more data indexes. The one or more data indexes may have the form of an inverted index. A typical inverted index maps individual terms to particular documents that contain each term. In some conventional information retrieval systems, a list of document identifiers for a particular term is referred to as a postings list where each document identifier added to a given list is a posting. Given an inverted index, a conventional information retrieval system can execute search queries by taking the union or intersection of particular postings lists, scoring the resulting candidate documents, and returning one or more best scoring ones.

SUMMARY

This specification describes how to index data in an information retrieval system and how to retrieve such indexed data to respond to search requests.

Particular embodiments of the subject matter described in this specification can be used to index data and retrieve indexed data efficiently in the context of large document collections that rapidly increase in size. For example, a document collection that includes social media posts can rapidly increase in size in response to user activity. In such document collections, documents with varying types and formats (e.g., social media text posts of various lengths, longer text documents, posts, images, and videos) are often created and ingested into the system on massive scales and in short amounts of time. Users expect to be able to search such documents with minimal delay after those documents are created. As a result, efficient search solutions in the context of document collections with high social media activity need to ensure fast indexed data availability despite the large size of document collection. Particular embodiments of the subject matter described in this specification can enable faster indexing of data and retrieval of indexed data, thus facilitating effective real time or near real time search of the rapidly increasing collections of documents.

In general, one innovative aspect of the subject matter described in this specification can be embodied in a system including a plurality of non-transitory computer readable storage media, wherein the plurality of non-transitory computer readable storage media store one or more postings lists for a corresponding term, and wherein each postings list includes a plurality of postings blocks, a plurality of position blocks, and a plurality of metadata blocks. Each of the plurality of postings blocks includes one or more document identifiers and respective indications of frequency of the term in each respective document associated with each respective document identifier. Each of the plurality of position blocks includes a plurality of position indications for the term in the documents of a corresponding postings block. Each of the plurality of metadata blocks is associated with a respective one of the plurality of postings blocks and includes an indication of the size of the respective document identifiers in the associated postings block, an indication of the size of the respective indications of frequency of terms in the associated postings block, an indication of a number of postings in the associated postings block, and an indication of position information for postings in the associated postings block. The plurality of metadata blocks are associated with a header including a plurality of header fields, where the plurality of header fields identify a pointer to the plurality of postings blocks and a pointer to the plurality of position blocks.

Other embodiments of this aspect include methods to generate one or more of the postings lists described above or to use one or more of the postings lists to retrieve indexed information. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Each document identifier represents a document in which the term associated with the postings block appears and uses an identification of the respective document that is generated for local use of the postings list. Each of the plurality of position blocks further includes a count of the respective plurality of position indications and an indication of the size of each of the respective plurality of position indications. Each of the one or more document identifiers in each respective one of the plurality of postings blocks appear in an ascending order and each of the one or more document identifiers in each respective one of the plurality of postings blocks represents the difference between an identifying value of the respective document and an identifying value of a document immediately preceding the respective document in the respective ordered postings block. Each of the plurality of metadata blocks further includes a document identifier of a last document in a postings block whose position precedes the respective postings block associated with the respective metadata block. Each of the plurality of metadata blocks further includes an offset to a location in the respective position block associated with the respective metadata block where position information associated with the respective metadata block start. Each of the plurality of header blocks further includes a header field identifying a count of the plurality of postings blocks.

Another innovative aspect of the subject matter described in this specification can be embodied in methods that include the action of obtaining the search query, the search request including a search phrase; identifying a term appearing in the search phrase; identifying a postings list associated with the term; accessing a plurality of metadata blocks in the postings list, each of the plurality of metadata blocks being associated with one of a plurality of postings blocks, wherein each of the plurality of postings blocks includes a respective plurality of document identifiers and a respective plurality of indications of frequency of the term in each document associated with each respective document identifier; for each of the plurality of metadata blocks, determining whether to access the respective postings block associated with the metadata block based on a first set of information in the respective metadata block; in response to determining to access the respective postings block associated with the metadata block, generating operations needed to access the respective postings block associated with the metadata block based on a second set of information in the respective metadata block and accessing respective document identifiers and respective indications of frequency of the term in the respective postings block associated with the metadata block; and using information extracted from the postings list to determine one or more search results responsive to the obtained search query.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The first set of information in each of the plurality of metadata blocks includes a document identifier of a last document in a postings block whose position precedes the respective postings block associated with the respective metadata block. The second set of information in each of the plurality of metadata blocks includes an indication of the size of each of a plurality of document identifiers in the respective postings block associated with the respective metadata block and an indication of the size of each of the plurality of indications of frequency of terms identifiers in the respective postings block associated with the respective metadata block. The operations needed to access the respective postings block associated with each metadata block include a plurality of bitwise shift operations and a plurality of mask operations. The methods include determining that the search phrase includes two or more terms; and in response, for each of the plurality of metadata blocks whose respective postings block is determined to be an access target, determining operations needed to access a respective position block associated with the respective metadata block based on a third set of information in the respective metadata block and accessing the respective position block associated with the respective metadata block. The third set of information in each of the plurality of metadata blocks includes an indication of the respective position block associated with the respective metadata block and an indication of the offset to a location in the respective position block where position information associated with the respective metadata block start.

Another innovative aspect of the subject matter described in this specification can be embodied in methods that include the actions of obtaining a plurality of terms, each of the plurality of terms having a low occurrence frequency and appearing in one or more documents each identified by a respective document identifier; obtaining, for each of the plurality terms appearing in each of the one or more documents, a respective position identifier; and generating a low occurrence postings list for the term, wherein the low occurrence postings list includes a first plurality of data strings including each respective document identifier associated with each of the plurality of terms and a second plurality of data strings including each respective position identifier associated with each of the plurality of terms appearing in each of the one or more documents.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The methods include generating a plurality of metadata fields associated with the low occurrence postings list, the plurality of metadata lists including an indication of the size of each respective document identifier and an indication of the size of each respective position identifier. The methods include determining, for each of the plurality of terms having a low occurrence frequency, an indication of the respective term, an indication of the position in the first plurality of data strings where a first document identifier associated with the respective term appears; and a count of the number of documents in which the respective term appears.

Particular embodiments of the subject matter described in this specification can be implemented so as to realize one or more of the following advantages. Data to be indexed can be stored in a data structure having a format that reduces storage size as compared to conventional postings list data structures. A postings list data structure is provided that precomputes count of occurrence data for terms in a collection of documents. The precomputed counts allow for a search over longer documents in a manner that can be used to rank such documents based at least in part on the count of occurrence of terms in those documents. A postings list data structure is provided that stores document identifiers associated with a term and position identifiers associated with the occurrence of the term separately. Separate storage of document identifiers and position indications can increase the speed at which search is performed when such a search does not need to access position indication values. Storing position indications outside the postings blocks can also greatly reduce the required space for storing indexed data of longer documents that may have occurrences of the same term in multiple locations. Indexed data for low occurrence terms can be stored in data structures that do not include precomputed counts of occurrence of terms, thus reducing the storage and computational requirements of storing such low occurrence terms.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes indexing occurrences of a term in a set of documents for retrieval by an information retrieval system. As used in this specification, a term is a unit of data (e.g., a word) whose occurrence in a set of documents is tracked separately from other such units (e.g., using a different set of postings lists). A phrase is a combination of one or more terms. A search phrase is the main input parameter of a search query which may include one or more terms.

Figure 1:
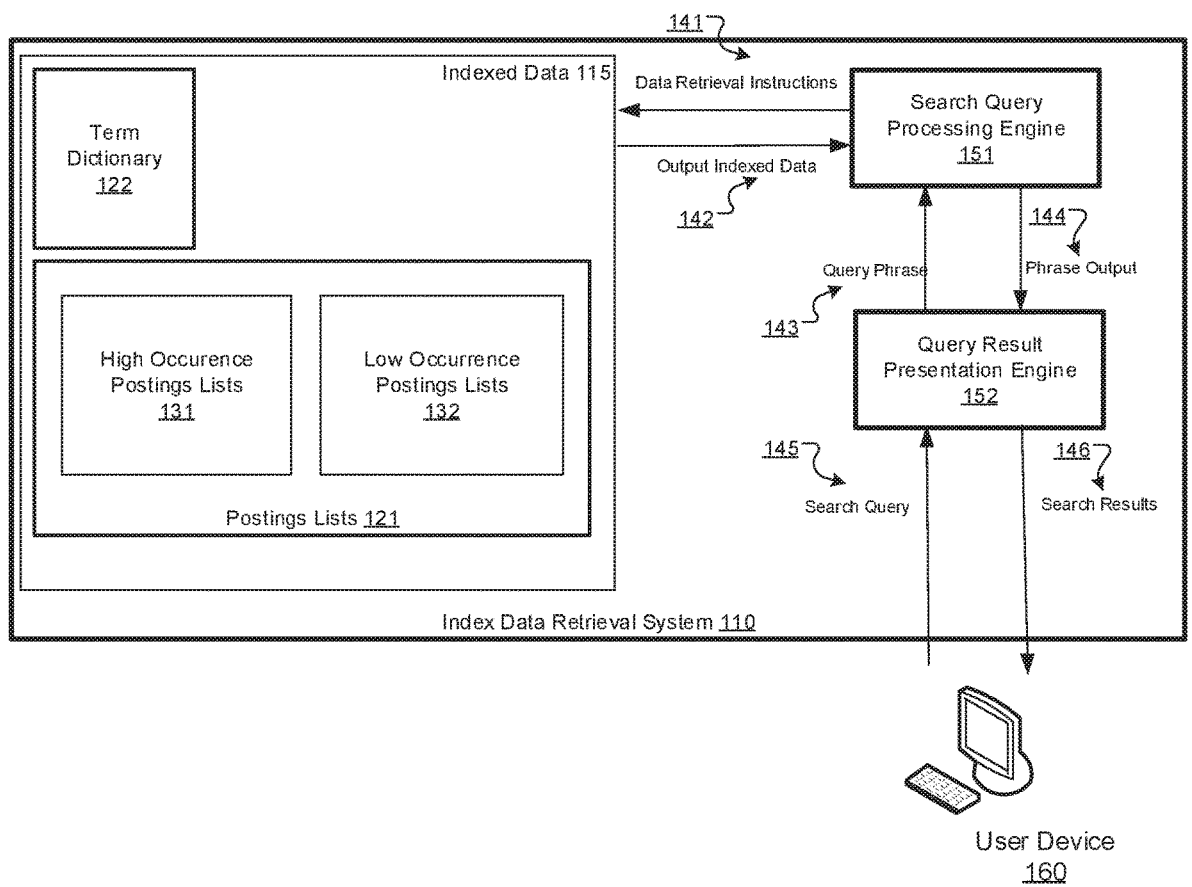
FIG. 1 is a diagram that illustrates an example system.

FIG. 1 is a diagram that includes an example information retrieval system 110. The information retrieval system 110 interacts with a user device 160 including receiving a search query 145 from the user device 160 and returning search results 146 to the user device 160.

The system 110 includes indexed data 115. Indexed data 115 includes pre-computed values about occurrence of a set of terms in a collection of documents tracked by the system 110. The indexed data 115 include a term dictionary 122 that relates each term with a set of postings lists 121. Each postings list 121 includes information about occurrence of terms in a set of documents. Postings lists 121 may be of one of two kinds: high occurrence postings lists 131 store information about occurrence of terms whose occurrence frequency in the set of documents exceeds a threshold value, while low occurrence postings lists 132 store information about occurrence of terms whose frequency in the set of documents does not exceed a threshold value. High occurrence postings lists 131 will be described in greater detail below with respect to FIG. 2. Low occurrence postings lists will be described in greater detail below with respect to FIG. 3.

Search query processing engine 151 interacts with indexed data 115 by issuing data retrieval instructions 141 to receive output indexed data 142. Search query processing engine 151 determines which parts of the indexed data 115 need to be accessed to respond to a received search query and what instructions enable accessing those parts. Search query processing engine 151 obtains an output indexed data 142 in response to data retrieval instructions 141 from the indexed data 115. In some implementations, the search query processing engine 151 also obtains a search phrase 143 from a query result presentation engine 152 and returns a phrase output to the query result presentation engine 152. To do so, the search query processing engine extracts particular information from the indexed data 115 based on an analysis of the query phrase 143.

Query result presentation engine 152 obtains the search query 145 from the user device 160 and returns search results 146 to the user device, e.g., for display to a user. To do so, the query result presentation engine 152 determines the query phrase 143 in a search query 145. The query result presentation engine 152 also transforms the output 144 provided by the search query processing engine 151 into user interface elements 151 for presentation to user device 160.

Figure 2:
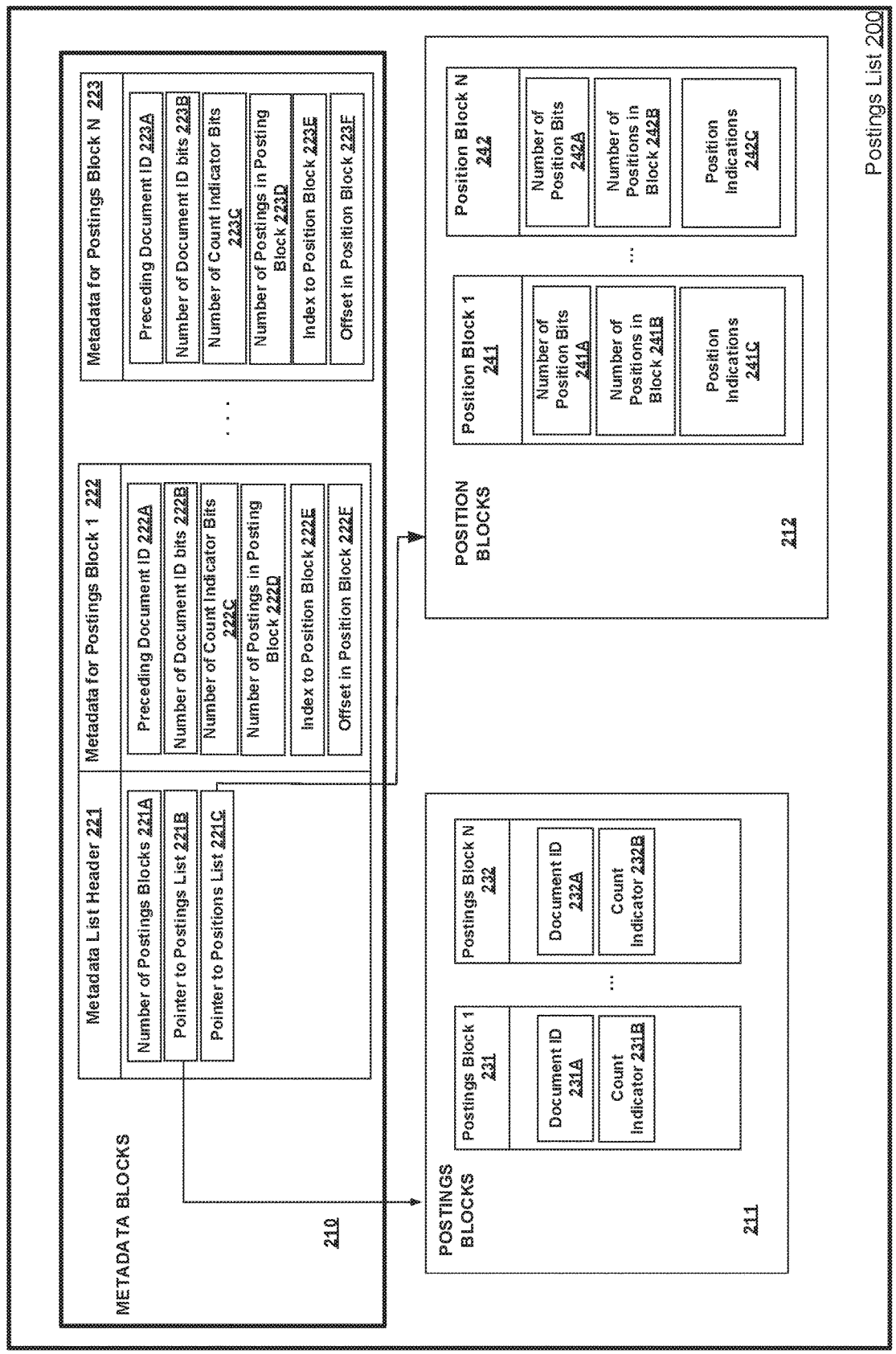
FIG. 2 illustrates an example postings list.

FIG. 2 illustrates an example postings list 200. The postings list 200 represents information about occurrence of a term in one or more documents of a collection of documents. The postings list 200 may be an example postings list 121 as illustrated in FIG. 1, and may be stored on a computer system including one or more computer readable storage media (such as a main memory), such as the index data retrieval system 110 of FIG. 1. As described above, a postings list (e.g., postings list 200) may be used along with a term dictionary to process a search query issued by a user device.

The postings list 200 comprises metadata blocks 210, postings blocks 211, and position blocks 212. The metadata blocks 210, the postings blocks 211, and position blocks 212 are stored separately (i.e., in separate sets of data) from each other on one or more computer readable storage media, for example, as distinct data structures.

Postings blocks 211 include one or more data blocks (e.g., data blocks 231 and 232), wherein each of those data blocks includes information about occurrence of the term associated with the postings list 200 in documents. Each postings block includes one or more postings, and each posting includes two data fields: a data field (e.g., data fields 231A and 232A) identifying a document in which the term appears and a data field (e.g., data fields 231B and 232B) identifying the count of occurrence of the term in the identified document. A document identification value may be an identification value that is global to the system as whole or a value that is local to a postings list. In some implementations, the postings in each postings block are ordered by an ascending order of document identification values. In some of those implementations, the value of a document identification is represented by a delta value denoting the difference between the global or local identification of the corresponding document and the global or local identification of the preceding identified document in the ordered list.

For example, if a first document has a local identifier of (5) and a second document in the postings list has a local identifier of (10), delta compression can be used to replace the local identifiers with the difference between a document identifier and the previous document identifier. In this example, the local identifier of (10) for the second document can be replaced by the delta value of (5) representing the difference between the identifiers of the first and second documents. This allows the document identifiers to be represented using fewer bits.

In some implementations, the count indicators denote the count of occurrence of the term associated with the postings list 200 in each identified document. In some implementations, since many terms may only occur once in a document, the storage space required to record the count indicators can be reduced by storing the count of occurrences minus 1. This technique can enable storing count indicator values in zero bits if each document in a postings block contains the term associated with the postings list 200 only once.

In an example, the term "I" may appear in three postings of a particular postings block based on the occurrence of the term in three documents, as illustrated in the table below:

| Document IDs | Term Occurrence |
|---|---|
| 101 | I just called to say I love you. |
| 126 | I just called to say how much I care. |
| 151 | And I mean it from the bottom of my heart. |

The postings block for the term "I" containing the term's occurrence in the three noted documents may order the postings in an ascending order of document identifiers, store the document identifier of the first document and delta values for document identifiers of subsequent documents, and store a subtraction of the count of occurrence of the term in each document by one. As such, the posting block will have the following values stored in it:

| Term | Postings List (Delta, count − 1) |
|---|---|
| I | (101,1), (25,1), (50,0) |

The first posting shows that the term "I" appeared twice in the document. This results in a count−1 value of "1". Since the first posting has the lowest document identifier, the delta is zero. The second posting of the postings block shows that the term "I" appeared in a document having a delta value of 25 relative to the lowest document identifier (i.e., document with document identification 126) and appeared once in that document.

In some implementations, all occurrence count values are zero because the term only occurs once in a given postings list. Consequently, the system can avoid storing those values at all. As a result, storing the postings block would need six bits for the largest document identifier value (50 or $110010_2$) and zero bits for storing occurrence count values. This is an improvement over storing document identification and count frequency values without delta values and subtraction, which would require eight bits for the largest document identifier value (151 or $10010111_2$) and one bit for storing count frequency values.

Position blocks 212 include one or more data blocks (e.g., data blocks 241 and 242). Each of those data blocks includes information about the position of occurrence of the term associated with the postings list 200. In particular, each position block includes position information of occurrences of the term in a corresponding postings block segment. Each position block contains data fields (e.g., data fields 241A and 242A) identifying the size in number of bits of each position indicator data field (e.g., data fields 241C and 242C) in the position block as well as data fields (e.g., data fields 241B and 242B) identifying the count of position indicator data fields (e.g., data fields 241C and 242C) in the position block. Each position block also contains data fields (e.g., 241C and 242C) identifying one or more position indications.

The system can use the data fields to generate operations to extract relevant information from position indications. For instance, in position block 1 241, if data fields 241A and 241B contain values '4' and '5' respectively, the system can determine that the first four bits of the position indications field 241C contain the first position indication in that field, while the second four bits contain the second position indication in that field, and so on. The system can also determine that the position indications field 241 C includes five position indications.

For instance, the system can store the position indications associated with the occurrence of the term "I" in the example postings above in a position block in the following form:

| Term | Positions |
|---|---|
| I | 0, 5, 0, 7, 1 |

The order of position indications in the position block segment is in accordance with the order of postings in the postings block corresponding to the position block segment. For example, in the first document, the term "I" occurs as the first term and the sixth term. Starting with zero, that corresponds to positions 0 and 5. The second document has the term "I" occurring in the first and eighth positions. When decoding, to determine whether a particular position value is associated with a particular posting in the posting list, the position information needs to be combined with the occurrence count information.

The positions blocks can be encoded with bit values corresponding to the position values and bit-packed. To decode a particular positions block, the system uses the number of bits used for position and the number of positions in the block. This can be stored in the first integer of the block, for example, a 32-bit integer using 5 bits to encode "bits per position" and 11 bits to encode "number of positions."

Keeping with the above example where there are three bits per position and four total positions, the positions blocks can be represented using a header and each positions block as:

| | | | |
|---|---|---|---|
| 0001 1000 0000 | 0001 0100 0111 | . . . | . . . |
| 0101 0000 0000 | 0010 0000 0000 | | |
| 0000 0000 | 0000 0000 | | |
| Positions_block[0] (bits per position, # positions) | Positions_block[1] (positions) | . . . | Positons_block[n] |

Metadata blocks 210 include one or more data blocks (e.g., data blocks 222 and 223), wherein each of those data blocks includes information about the storage of information in postings blocks 211 and position blocks 212. The information contained in the data blocks of the metadata blocks 210 can be used to process information stored in the postings blocks 211 and the position blocks 212. Each metadata block (i.e., a data block of the metadata blocks 210) contains information related to a postings block and a position block associated with the postings block.

In particular, each metadata block contains a data field (e.g., data fields 222A and 223A) specifying an identification of the last document appearing in a preceding postings block. This data field can be used to skip reviewing a postings block based on the documents appearing in their preceding postings blocks. A document identification value may be an identification value that is global to the system as whole or a value that is local to a postings list.

A metadata block further contains a data field (e.g., 222B and 223B) identifying the length in number of bits of the document identification field (e.g., 231A and 232A) of a postings block (e.g., 231 and 232). In addition, the metadata block further contains a data field (e.g., 222C and 223C) identifying the length in number of bits of the count indicator field (e.g., 231B and 232B) of a postings block (e.g., 231 and 232). Moreover, the metadata block further contains a data field (e.g., 222D and 223D) identifying the count of the postings in a postings block (e.g., 231 and 232), wherein each posting of a postings block may be a pair of a document identification (e.g., 231A and 232A) and a corresponding count indicator (e.g., 231B and 232B). In some implementations, the data field signifying the number of bits of count indicator fields (e.g., data fields 222C and 223C) may have a value of zero, which shows that all values in a postings block are document identification values, e.g., when the term only occurs once in each document.

The system uses the three data fields of the metadata block (i.e., the data field identifying size of the document identification fields of a postings block, the data field identifying the size of the count indicator data fields of a postings block, and the data field identifying the number of postings in the postings block) to generate operations to extract relevant information from a postings block. For instance, if postings block 1 231 is 32 bits in size and fields 222B, 222C, and 222D of the corresponding metadata block 222 have values 5, 3, and 3 accordingly, then the system can determine that the first 8 bits of postings block 1 231 contain the first posting, the second 8 bits contain the second posting, the third 8 bits contain the third postings, and the rest of the postings block does not contain information related to particular postings. Moreover, we can determine that, within each posting, the first 5 bits signify a document identification and the other 3 bits signify a count indicator corresponding to the document identified.

A metadata block further contains a data field (e.g., data fields 222E and 223E) identifying the index to a position block that includes position information corresponding to the postings block associated with the metadata block. Moreover, the metadata block contains a data field (e.g., data fields 222F and 223F) identifying the offset to the position in the indexed position block where information relevant to the associated postings block appear. The system uses the position bits of the metadata block to generate operations to extract relevant information from a position block. For instance, in metadata block 222 associated with postings block 1 231, if the data fields 222E and 222F contain values '1' and '0' respectively, the system can determine that the position information corresponding to postings block 1 231 can be found in the 0th position of the 1st position block (e.g., position block 1 241).

In some implementations, a metadata block does not include the field identifying the index to position blocks (data fields (e.g., data fields 222E and 223E) and the field identifying the offset to position information (e.g., data fields 222F and 223F) if the postings block associated with the metadata block indexes information that are not associated with a position in a document or if the position information associated with the indexed information cannot be determined.

The metadata blocks 210 are associated with header fields 221. The system uses the header fields 222 to obtain information about the number of blocks in the metadata blocks 210 and to access postings blocks 211 and positions blocks 212 associated with the metadata blocks 210. The header fields 222 include a field 221A identifying the number of postings blocks whose corresponding information is included in the metadata blocks 210, a field 221B containing a pointer to the postings lists 211, and a field 221C containing a pointer to the position lists 212.

In some implementations, each of the metadata blocks (e.g., blocks 222 and 223) are of a smaller size than each of the postings blocks (e.g., blocks 231 and 232) and position blocks (e.g., blocks 241 and 242). In some implementations, each postings block and position block are of a fixed size, and the number of postings or position indications in each block depends on how many postings or position indications can fit in the fixed size of the respective postings or position block.

Figure 3:
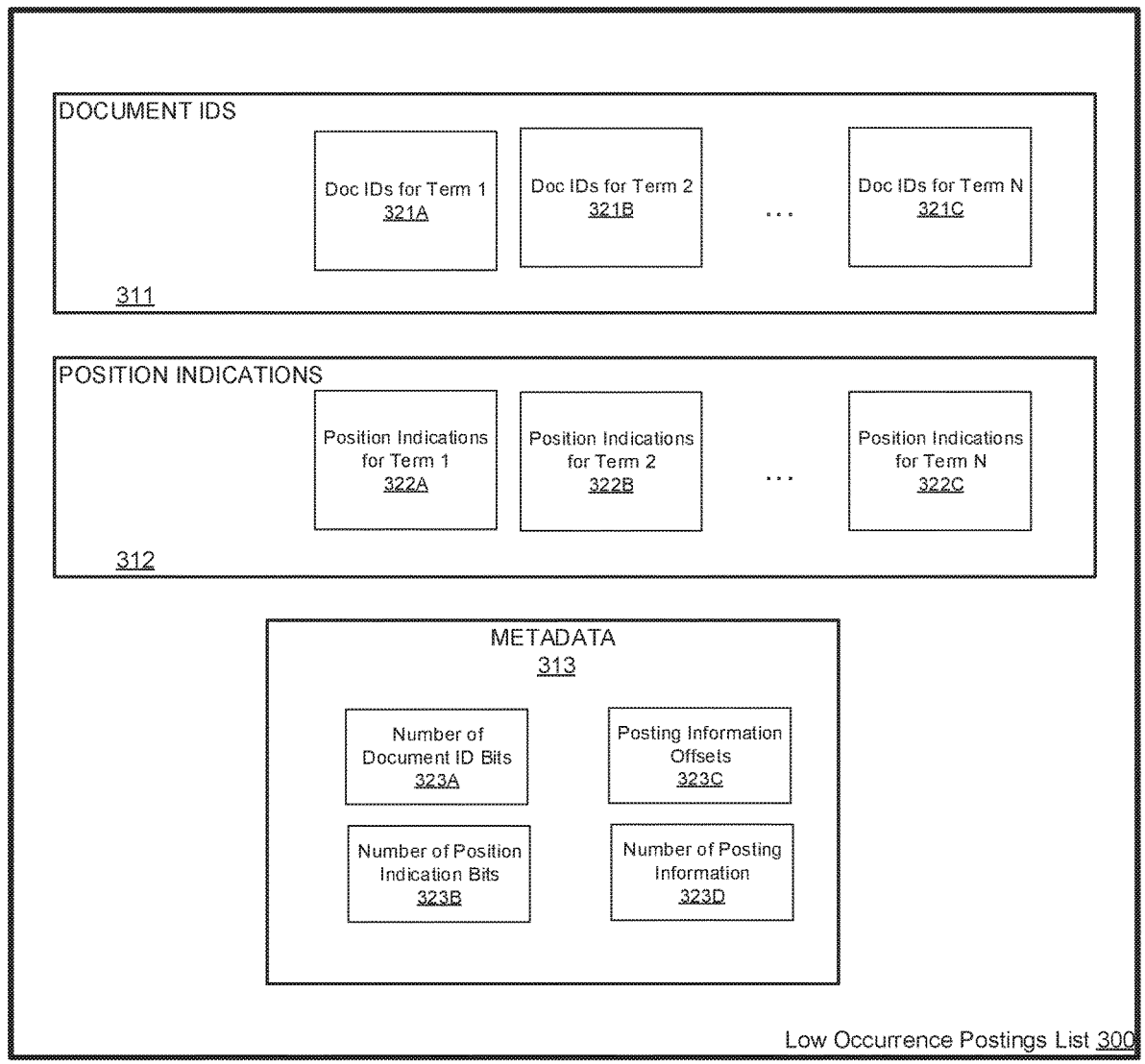
FIG. 3 illustrates an example low occurrence posting list.

FIG. 3 illustrates an example low occurrence postings list 300. The postings list 300 represents information about occurrence of terms in one or more documents. The postings list 300 may be an example of one of the postings lists 121 as illustrated in FIG. 1, and may be stored on a computer system including one or more computer readable storage media, such as the information retrieval system 110 of FIG. 1. As discussed previously, a postings list (e.g., postings list 300) may be used along with a term dictionary to process a search query issued by a user device.

Low occurrence postings list 300 may be used to store postings lists corresponding to low occurrence terms. Low occurrence terms are those terms whose total occurrence frequency in the documents tracked by the system falls below a threshold value. Low frequency postings list 300 includes features that can reduce storage requirements for indexing low occurrence terms.

Low-occurrence postings list 300 includes a set of document identifications 311, a set of position indications 312, and metadata fields 313. Document identification sets 311, position indication sets 312, and metadata fields 313 are stored separately (i.e., in separate data structures) from each other on one or more computer readable storage media.

Document identification sets 311 include data segments (e.g., data segments 321A-C), wherein each of data segments represents document identifications for a particular low occurrence term. A document identification value may be an identification value that is global to the system as whole or a value that is local to a postings list. In some implementations, the document identifications in each data segment are ordered by an ascending order of document identification values.

Position indication sets 312 include data segments (e.g., data segments 322A-C), wherein each of data segments represents position indications corresponding to a data segment of the document identification sets 311. In other words, each data segment of position indication sets 312 represents the position at which a term appears in the documents identified by the corresponding data segment of document identification sets 311. In some implementations, the ordering of document identification information and position indication information in data segments of document identification sets 311 and position indication sets 312 correspond to each other, such that the first value of a data segment of position indication sets 312 refers to the position of occurrence of a corresponding term in the document identified by the first value of the corresponding data segment of the document identification sets 311.

In contrast to the postings list 200, the low occurrence postings list 300 includes more than one term found in the collection of documents. For example, rare terms and their postings can be represented as:

| Term | Postings List (Document Identifier, Position) |
|---|---|
| Rareterm-1 | (0, 0) |
| Rareterm-2 | (25, 1), (25, 2) |
| Rareterm-3 | (5, 1), (6, 0) |

Here, the count of occurrences and positions are not separated. Thus, for a given term, the postings list identifies the document identifier in which the term occurs and the position within the document. Additionally, because more than one term is used, the document identifiers are not always ascending. As a result, the delta compression is not used. To generate the postings list, the minimum number of bits required to store the document identifiers and the positions are determined, e.g., in the above example 5 bits are needed for each document identifier and 2 bits are needed for each position. An example resulting postings list for the above rare terms can be represented as:

| | Postings list entries |
|---|---|
| Document IDs (5 bits per entry) | 00000 11001 11001 00101 00110 |
| Positions (2 bits per entry) | 00 01 10 01 00 |

Metadata fields 313 include information about storage of information in document identification sets 311 and position indication sets 312. In particular, metadata fields include a data field 323A that identifies the size in number of bits of each document identification value (e.g., a value of data segments 321A-C) and the size in number of bits of each position indication values (e.g., a value of data segments 322A-C). The metadata fields 313 also include, for each of the low occurrence terms, fields identifying posting information offset values 323C and the number of posting information (i.e., document identification values and position indication values start) associated with each term 323D. Posting information offset values represent a position in the document identification sets 311 and position indication sets 312 where posting information corresponding to each term begin. For instance, imagine the following metadata information associated with the term "rareterm":

| Metadata Information | |
|---|---|
| Posting Information Offset Value | 3 |
| Number of Posting Information | 2 |

If the system is processing "4 51 62 7 12 3 43 51 644 722 81" for document identification sets 311, the system can determine that (starting the count from the $0^{th}$ document identification) the document identifications for the term "rareterm" are "7 and 12." The system can similarly process the position indication sets 312.

The system uses information provided by the metadata fields 313 to generate operations to extract relevant information from document identification sets 311 and position indication sets 312. The system can multiply metadata fields about the posting information offset value 323C by metadata fields identifying the size of document identifiers 323A or position indications 323B to locate the starting point of relevant posting information corresponding to a term. The system can also multiply metadata fields about number of posting information 323D associated with term by metadata fields identifying the size of document identifiers 323A or position indications 323B to locate the ending point of relevant posting information corresponding to a term. The system can use metadata fields identifying the size of document identifiers 323A or position indications 323B to extract portions of posting information corresponding to the occurrence of a term in a particular document. For instance, if fields 323A and 323B of the metadata fields 323 include values '4' and '3' respectively, the system uses those values to determine which portions of each data segment refers to which document identification or position indication value.

Figure 4:
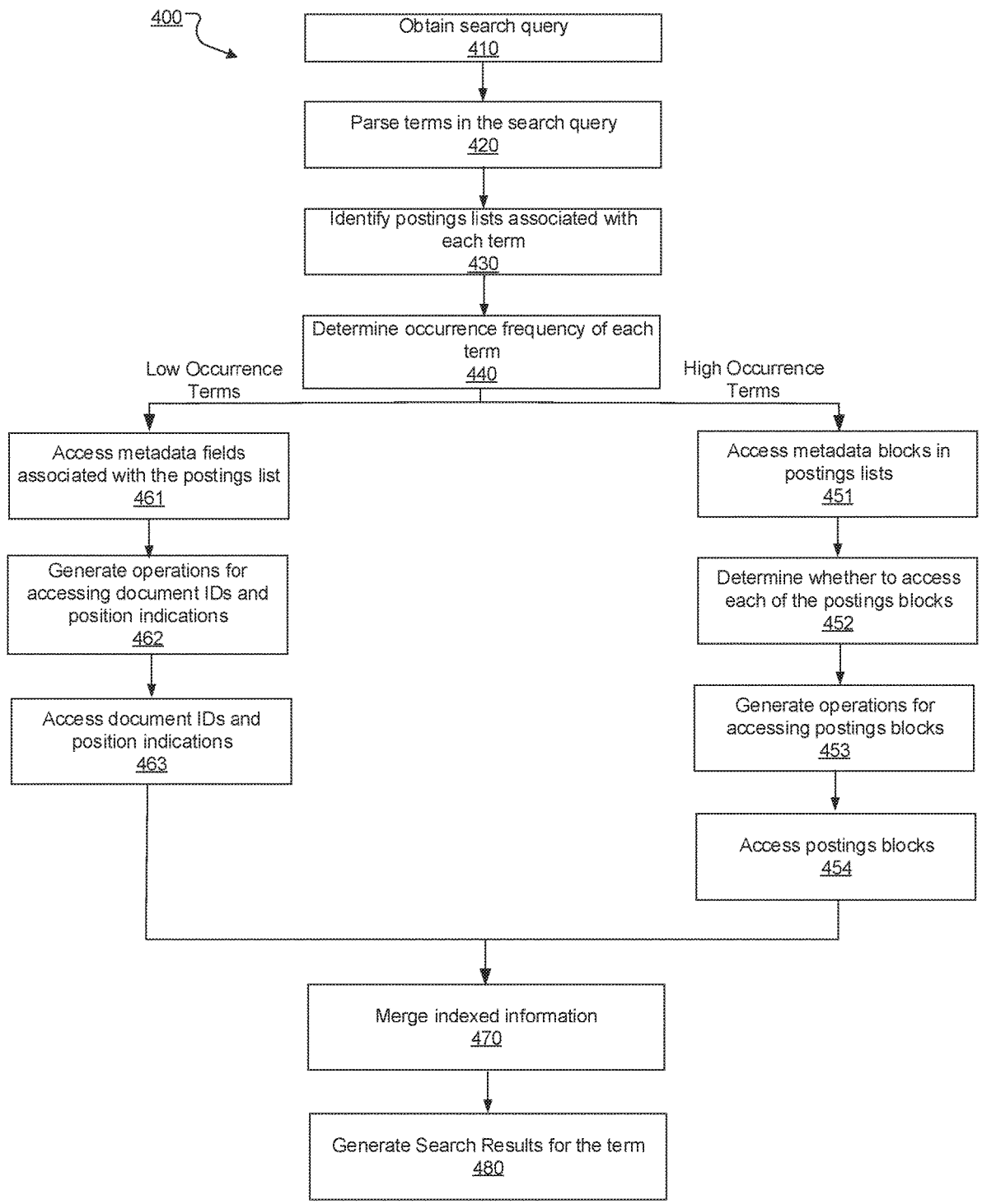
FIG. 4 is a flow chart of an example process for processing search results using postings lists.

FIG. 4 is an example process 400 for processing a search query using postings lists. The system can use the process 400 to generate results in response to a search query using a postings list (e.g., postings list 200 of FIG. 2). The process 400 can be implemented by one or more computer programs installed on one or more computers. The process 400 will be described as being performed by a system of one or more computers, e.g. the information retrieval system 110 of FIG. 1.

The system obtains a search query (410) and parses the search query to identify one or more terms in the search query (420). A search query is associated with a search phrase, which may be a combination of one or more words. Depending on the architecture of the system, a search phrase may correspond to more than one term in the term dictionary. As such, more than one sets of postings lists may need to be accessed to process a search query. In particular, the system can parse the search query into individual terms or combinations of terms to generate terms of the search phrase.

The system identifies a postings list associated with each identified term (430). The system may use a term dictionary or other index to determine postings list associated with the term. For example, the system can match an identified term in the search query to a term in the term dictionary. The term dictionary can then indicate the corresponding postings lists associated with the term. The system uses the postings lists to determine information about occurrence of the term in the documents tracked by the system.

The system determines whether each term is a high occurrence term or a low occurrence term (440). For high occurrence terms, the system performs steps 451-454. For low occurrence terms, the system performs steps 461-462.

For high occurrence terms, the system accesses metadata blocks in the postings list (451). The system may use information mapping the name of a metadata block and its corresponding position in computer readable storage media to access the metadata block. The system then uses the information contained in the metadata block to determine how to analyze the postings list corresponding to each identified high occurrence term. For high occurrence terms, the system determines whether to access each of the postings blocks of the postings list (452). The system performs this task based on the fields in each metadata block that identify the document identification of a last document of a preceding postings block (e.g., data fields 222A and 223A in FIG. 2). If the noted fields show that a postings block should not be reviewed, the system skips reviewing that postings block.

For high occurrence terms, the system generates operations to access each postings block (453). The system performs this task based on data fields in each metadata block that identify the size of document identification and count indication values in each posting of a postings block as well as the count of the postings in each postings block (e.g., data fields 222B-D and 223B-D of FIG. 2). The operations needed to access posting blocks may comprise a variety of bitwise operations, such as bitwise shift and mask operations. For instance, the system can extract the last two bits of an eight-bit integer by applying the following bitwise operations: (1) applying a bitwise AND operation on the eight-bit integer with the mask integer $11000000_2$; and (2) applying a logical right shift operation with a distance of six on the result of operation (1). The resulting value equals the value of the last two bits of the eight-bit integer. Applying similar operations on a postings list can retrieve desired information stored in the postings list about occurrence of a term in one or more documents. These bit values can then be used to generate responses to a query about occurrence of one or more terms in a set of documents.

For high occurrence terms, the system accesses desired postings blocks (453). The system uses operations generated in the previous step to access relevant portions of a postings block. As a result of accessing relevant portions of postings blocks, the system can retrieve information about the occurrence of terms in one or more documents. For instance, the system can determine that the term associated with the postings list within which a postings block is located occurs three times in a document with a particular document identification. The system can use this information to generate responses for search queries about phrases that involve the particular search term.

For low occurrence terms, the system accesses metadata fields associated with the postings list (461). The system uses metadata fields to generate operations to access relevant document identification values and position indication values in the postings list (462). In some implementations, the system uses metadata fields indicating the position at which relevant posting information for a low occurrence term appear (e.g., metadata field 323C in FIG. 3) and metadata fields indicating the number of posting information for the low occurrence term (e.g., metadata field 323D in FIG. 3) to determine the precise document identification and position indication values pertaining to the low occurrence term. In some implementations, the system uses metadata fields indicating the number of document identification bits in a postings list (e.g., metadata field 323A in FIG. 3) and metadata fields indicating the number of position indication bits in a postings list (e.g., metadata field 323B in FIG. 3) to extract particular document identification or position indication bits in a postings list. The system then accesses the document identification and position indication values based on the generated operations (463).

The system then merges indexed data returned for the one or more terms in the search query (470). In some implementations, the system performs this task by performing a union or intersection of the postings information retrieved for the one or more terms. The system then uses the indexed information retrieved from merging relevant segments of postings lists to generate search results corresponding to the identified term (480). For example, the retrieved information can be scored and ranked. One or more highest ranked results can then be provided to the user. In some implementations, the results from multiple postings lists are analyzed to determine a responsive search result for a search phrase. For example, for a search query having more than one term and where the terms may require a particular order, the system can perform operations on the identified postings blocks to determine a union or intersection of the respective term results.

In some implementations, the system determines that processing search query requires accessing position blocks. The system uses information in metadata blocks to generate instructions to access relevant portions of position blocks and then accesses position blocks. In some implementations, the system determines that processing the search query requires accessing position blocks if the search phrase includes two or more terms where order of occurrence is identified as important in the search query.

In some implementations, a system of one or more computers (e.g. the information retrieval system 110 of FIG. 1) generates a postings list for a term when a new term is added to a term dictionary or other index of terms. The system determines if the term is a high occurrence term or a low occurrence term. If the term is a high occurrence term, the system creates a high occurrence postings list for the term (e.g., with a structure similar to the postings list 200 of FIG. 2). If the term is a low occurrence term, the system creates a low occurrence postings list with the term as the first member of the postings list (e.g., with a structure similar to the postings list 300 of FIG. 3) or, if a low occurrence postings list for the system has previously been created, adds the term to the existing low occurrence postings list.

In some implementations, a system of one or more computers (e.g. the information retrieval system 110 of FIG. 1) processes information about occurrence of a term in a document. The system detects if a postings list for the term has previously been created. For a low occurrence term, the system detects if a postings list for the term has previously been created if a low occurrence postings list for the system has previously been created. If a postings list for the term has previously been created, the system indexes information about occurrence of the term in the existing postings list. If a posting list for the term has not previously been created, the system creates a postings list for the term based on the occurrence frequency of the term. If the term is a high occurrence term, the system creates a high occurrence postings list for the term (e.g., with a structure similar to the postings list 200 of FIG. 2). If the term is a low occurrence term, the system creates a low occurrence postings list with the term as the first member of the postings list (e.g., with a structure similar to the postings list 300 of FIG. 3). The system can repeat this process to index information about the occurrence of many terms in many documents.

An electronic document, which for brevity will simply be referred to as a document, may, but need not, correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising a plurality of non-transitory computer readable storage media, the plurality of non-transitory computer readable storage media storing one or more postings lists for a corresponding term, wherein each postings list comprises:
    a plurality of postings blocks, wherein each of the plurality of postings blocks comprises one or more document identifiers and respective indications of frequency of the term in each respective document associated with each respective document identifier;
    a plurality of position blocks, wherein each of the plurality of position blocks comprises a plurality of position indications for the term in the documents of a corresponding postings block; and
    a plurality of metadata blocks, wherein:
    each of the plurality of metadata blocks is associated with a respective one of the plurality of postings blocks;
    each of the plurality of metadata blocks comprises:
    an indication of the size of the respective document identifiers in the associated postings block,
    an indication of the size of the respective indications of frequency of terms in the associated postings block,
    an indication of a number of postings in the associated postings block, and
    an indication of position information for postings in the associated postings block; and
    the plurality of metadata blocks are associated with a header including a plurality of header fields, the plurality of header fields identifying a pointer to the plurality of postings blocks and a pointer to the plurality of position blocks.

2. The system of claim 1, wherein each document identifier:
represents a document in which the term associated with the postings block appears; and
uses an identification of the respective document that is generated for local use of the postings list.

3. The system of claim 1, wherein each of the plurality of position blocks further comprises a count of the respective plurality of position indications and an indication of the size of each of the respective plurality of position indications.

4. The system of claim 1, wherein:
each of the one or more document identifiers in each respective one of the plurality of postings blocks appear in an ascending order; and
each of the one or more document identifiers in each respective one of the plurality of postings blocks represents the difference between an identifying value of the respective document and an identifying value of a document immediately preceding the respective document in the respective ordered postings block.

5. The system of claim 1, wherein each of the plurality of metadata blocks further comprises a document identifier of a last document in a postings block whose position precedes the respective postings block associated with the respective metadata block.

6. The system of claim 1, wherein each of the plurality of metadata blocks further comprises an offset to a location in the respective position block associated with the respective metadata block where position information associated with the respective metadata block start.

7. The system of claim 1, wherein each of the plurality of header blocks further comprises a header field identifying a count of the plurality of postings blocks.

8. A method of processing a search query, the method comprising:
    obtaining the search query, the search request comprising a search phrase;
    identifying a term appearing in the search phrase;
    identifying a postings list associated with the term;
    accessing a plurality of metadata blocks in the postings list, each of the plurality of metadata blocks being associated with one of a plurality of postings blocks, wherein each of the plurality of postings blocks comprises a respective plurality of document identifiers and a respective plurality of indications of frequency of the term in each document associated with each respective document identifier;
    for each of the plurality of metadata blocks:
        determining whether to access the postings block associated with the metadata block based on a first set of information in the metadata block;
    in response to determining to access the postings block associated with the metadata block:
        generating operations needed to access the postings block associated with the metadata block based on a second set of information in the metadata block; and
        accessing respective document identifiers and respective indications of frequency of the term in the postings block associated with the metadata block; and
    using information extracted from the postings list to determine one or more search results responsive to the obtained search query.

9. The method of claim 8, wherein the first set of information in each of the plurality of metadata blocks comprises a document identifier of a last document in a postings block whose position precedes the respective postings block associated with the respective metadata block.

10. The method of claim 8, wherein the second set of information in each of the plurality of metadata blocks comprises an indication of the size of each of a plurality of document identifiers in the respective postings block associated with the respective metadata block and an indication of the size of each of the plurality of indications of frequency of terms identifiers in the respective postings block associated with the respective metadata block.

11. The method of claim 8, wherein the operations needed to access the respective postings block associated with each metadata block comprise a plurality of bitwise shift operations and a plurality of mask operations.

12. The method of claim 8, further comprising:
determining that the search phrase comprises two or more terms; and
in response, for each of the plurality of metadata blocks whose respective postings block is determined to be an access target, determining operations needed to access a respective position block associated with the respective metadata block based on a third set of information in the respective metadata block; and
accessing the respective position block associated with the respective metadata block.

13. The method of claim 12, wherein the third set of information in each of the plurality of metadata blocks comprises an indication of the respective position block associated with the respective metadata block and an indication of the offset to a location in the respective position block where position information associated with the respective metadata block start.

14. A method of generating a postings list, the method comprising:
obtaining a plurality of terms, each of the plurality of terms having a low occurrence frequency and appearing in one or more documents each identified by a respective document identifier;
obtaining, for each of the plurality terms appearing in each of the one or more documents, a respective position identifier; and
generating a low occurrence postings list for the term, wherein the low occurrence postings list comprises:
 a first plurality of data strings comprising each respective document identifier associated with each of the plurality of terms; and
 a second plurality of data strings comprising each respective position identifier associated with each of the plurality of terms appearing in each of the one or more documents.

15. The method of claim 14, further comprising:
generating a plurality of metadata fields associated with the low occurrence postings list, the plurality of metadata lists comprising an indication of the size of each respective document identifier and an indication of the size of each respective position identifier.

16. The method of claim 14, further comprising:
determining, for each of the plurality of terms having a low occurrence frequency, an indication of the respective term, an indication of the position in the first plurality of data strings where a first document identifier associated with the respective term appears; and
a count of the number of documents in which the respective term appears.

17. One or more non-transitory computer-readable storage media encoded with instructions that, when executed by one or more computers, cause the one or more computers to perform operations comprising:
obtaining the search query, the search request comprising a search phrase;
identifying a term appearing in the search phrase;
identifying a postings list associated with the term;
accessing a plurality of metadata blocks in the postings list, each of the plurality of metadata blocks being associated with one of a plurality of postings blocks, wherein each of the plurality of postings blocks comprises a respective plurality of document identifiers and a respective plurality of indications of frequency of the term in each document associated with each respective document identifier;
for each of the plurality of metadata blocks:
 determining whether to access the postings block associated with the metadata block based on a first set of information in the metadata block;
in response to determining to access the postings block associated with the metadata block:
 generating operations needed to access the postings block associated with the metadata block based on a second set of information in the metadata block; and
 accessing respective document identifiers and respective indications of frequency of the term in the postings block associated with the metadata block; and
using information extracted from the postings list to determine one or more search results responsive to the obtained search query.

18. The one or more non-transitory computer-readable storage media of claim 17, wherein the first set of information in each of the plurality of metadata blocks comprises a document identifier of a last document in a postings block whose position precedes the respective postings block associated with the respective metadata block.

19. The one or more non-transitory computer-readable storage media of claim 17, wherein the second set of information in each of the plurality of metadata blocks comprises an indication of the size of each of a plurality of document identifiers in the postings block associated with the respective metadata block and an indication of the size of each of the plurality of indications of frequency of terms identifiers in the respective postings block associated with the respective metadata block.

20. The one or more non-transitory computer-readable storage media of claim 17, further comprising instructions that when executed perform operations comprising:
determining that the search phrase comprises two or more terms; and
in response, for each of the plurality of metadata blocks whose respective postings block is determined to be an access target, determining operations needed to access a respective position block associated with the respective metadata block based on a third set of information in the respective metadata block; and
accessing the respective position block associated with the respective metadata block.

21. The one or more non-transitory computer-readable storage media of claim 20, wherein the third set of information in each of the plurality of metadata blocks comprises an indication of the respective position block associated with the respective metadata block and an indication of the offset to a location in the respective position block where position information associated with the respective metadata block start.

22. The one or more non-transitory computer-readable storage media of claim 17 wherein the operations needed to access the respective postings block associated with each metadata block comprise a plurality of bitwise shift operations and a plurality of mask operations.

23. One or more non-transitory computer-readable storage media encoded with instructions that, when executed by one or more computers, cause the one or more computers to perform operations comprising:
    obtaining a plurality of terms, each of the plurality of terms having a low occurrence frequency and appearing in one or more documents each identified by a respective document identifier;
        obtaining, for each of the plurality terms appearing in each of the one or more documents, a respective position identifier; and
    generating a low occurrence postings list for the term, wherein the low occurrence postings list comprises:
        a first plurality of data strings comprising each respective document identifier associated with each of the plurality of terms; and
        a second plurality of data strings comprising each respective position identifier associated with each of the plurality of terms appearing in each of the one or more documents.

24. The one or more non-transitory computer-readable storage media of claim 23, further comprising instructions that when executed perform operations comprising:
    generating a plurality of metadata fields associated with the low occurrence postings list, the plurality of metadata lists comprising an indication of the size of each respective document identifier and an indication of the size of each respective position identifier.

25. The one or more non-transitory computer-readable storage media of claim 23, further comprising instructions that when executed perform operations comprising:
    determining, for each of the plurality of terms having a low occurrence frequency, an indication of the respective term, an indication of the position in the first plurality of data strings where a first document identifier associated with the respective term appears; and
    a count of the number of documents in which the respective term appears.

* * * * *